(No Model.)

P. B. MYERS.
INKSTAND.

No. 499,140.  Patented June 6, 1893.

WITNESSES:
J. A. Bergstrom
C. Sedgwick

INVENTOR
P. B. Myers
BY Munn & Co
ATTORNEYS.

UNITED STATES PATENT OFFICE.

PHINEAS B. MYERS, OF BROOKLYN, NEW YORK.

INKSTAND.

SPECIFICATION forming part of Letters Patent No. 499,140, dated June 6, 1893.

Application filed February 16, 1893. Serial No. 462,550. (No model.)

*To all whom it may concern:*

Be it known that I, PHINEAS B. MYERS, of Brooklyn, in the county of Kings and State of New York, have invented a new and useful Improvement in Inkstands, of which the following is a full, clear, and exact description.

My invention relates to an improvement in ink stands, and has for its object to so construct the ink stand that one or more racks may be used in connection with the stand, the racks corresponding to the number of ink wells, and whereby when a particular rack is pressed downward, for example, the cover of the ink well or bottle in connection with which that particular rack is to be used, will be automatically opened while the covers of all the other wells will be closed, thus, for example, enabling a book keeper to place a red ink pen upon the rack which operated the lid of the red ink well, and the pens used for ordinary writing upon the rack connected with the well containing black ink. When red ink is to be used, in removing the pen from the red ink rack the rack is pressed downward and the cover of the red ink well will be automatically raised while that of the black ink well will be closed and vice versa, thus preventing the mistake which frequently occurs, of dipping the red ink pen in the black ink well, and vice versa, and enabling the operator to work with perfect safety and likewise with dispatch.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1:
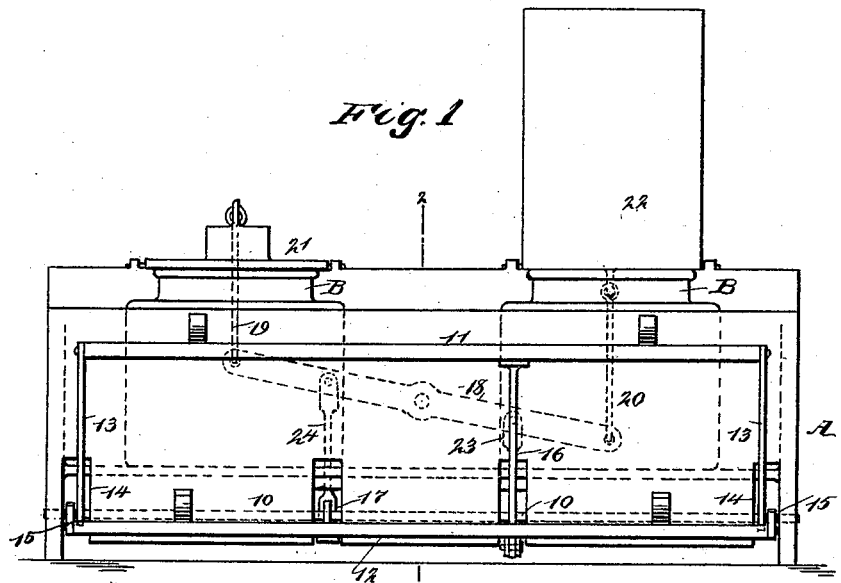
Figure 2:
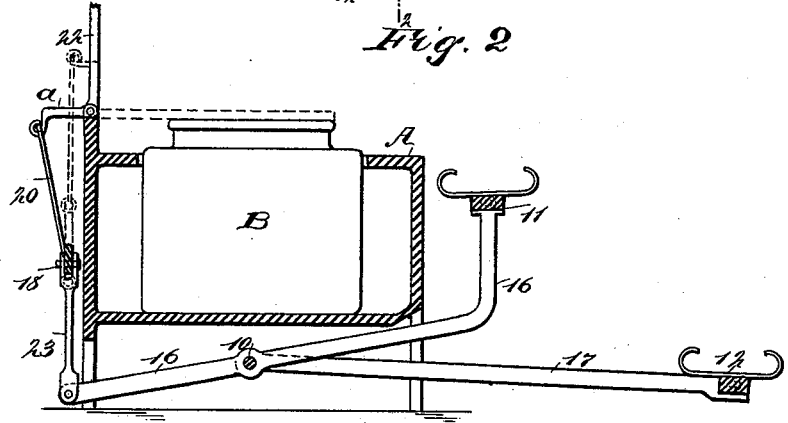
Figure 3:
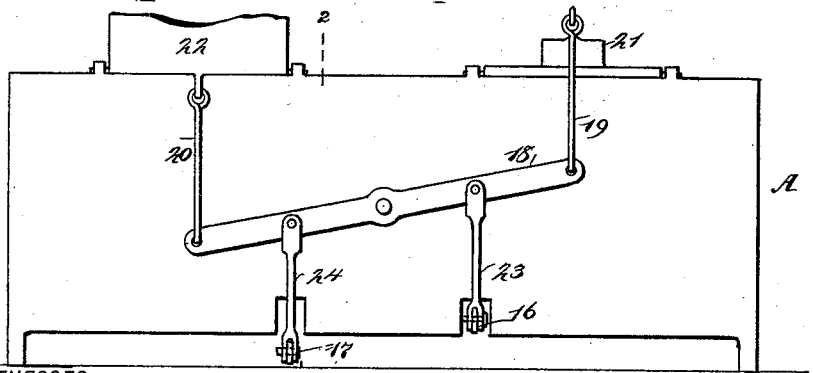

Figure 1 is a front elevation of the improved ink stand. Fig. 2 is a vertical section taken practically on the lines 2—2 of Figs. 1 and 3;
and Fig. 3 is a rear elevation of the ink stand.

In carrying out the invention the frame A, is constructed in any approved shape and of any suitable design, provision being made in the frame for the reception of any number of ink wells B, in the drawings two wells being shown as carried by the frame. In the bottom portion of the frame, preferably at the center, a fixed shaft 10, is made to extend preferably from end to end; and when two ink wells are employed two racks, designated respectively as 11 and 12, are used, said racks being adapted to hold pen-holders and like articles. The racks extend longitudinally and horizontally in front of the ink stand, one below the other, and the upper rack is made to more closely approach the front of the ink stand than the lower one, although the arrangement of the racks may be varied as occasion may demand. The upper rack, for example, is adapted to hold red ink pens and may be colored red, while the lower rack 12 is to hold black ink pens and may be correspondingly colored. The upper rack 11, is connected by arms 13, located at its ends and securely attached thereto with the fixed shaft 10, the arms being pivotally connected with the shaft; and preferably the arms 13, are made to extend through openings 14 in the front of the body of the stand. Similar arms 15, are secured to the ends of the lower rack, and are also pivoted upon the fixed shaft; and the upper rack is provided with an attached angle arm 16, which extends downward and inward through an opening in the bottom of the frame, the lower or horizontal member of the angle arm 16 being fulcrumed upon the fixed shaft 10, and the said member extends beyond said shaft and beyond the back of the stand body through an opening therein, as shown in Figs. 2 and 3. As the lower rack is nearer the support of the stand frame than the upper rack, a straight arm 17, is attached to this rack, and that arm is fulcrumed upon the fixed shaft 10, and likewise extends rearwardly beyond the rear face of the ink stand body; and the location of the two arms 16 and 17 is such that an arm will project at the back of the ink stand body, one at each side of the center at an equal distance therefrom.

Upon the back of the ink stand body a lever 18, is pivoted at its center, and this lever is connected at its ends by links designated respectively as 19 and 20, with covers 21 and 22, adapted to close over the ink wells, the covers being preferably provided with a rear extension $a$, as shown in Fig. 2, for connection with the links. The covers are ordinarily hinged to the frame in such manner that when brought to a horizontal position they will completely close over and may engage with the mouth of the ink wells.

The lever 18, is operated by manipulating the racks 11 and 12; and the operating connection is made by connecting the angle arm 16 with the lever 18 between its center and one end by means of a link 23; and the arm 17, connected with the lower rack is connected with the lever 18 between its center and opposite end by a similar link 24. Thus, when one of the racks is depressed to its full extent the end of the lever with which the rack is connected will be pressed upward, and the lid or cover connected with the ascending end of the lever will be closed, while the lid connected with the descending end of the lever will be opened. Therefore, it will be observed that the rack adapted to carry the red ink pens will be connected by means of its pivotal arm 16 with the cover of the black ink well, while the rack adapted to carry the black ink pens will be connected with the cover adapted to close the red ink bottle or well.

The construction of the ink stand is exceedingly simple, it is very practical, and it is capable of being operated expeditiously and conveniently, and will obviate by its use the mistake which frequently occurs of dipping the black ink pen in the red ink well, and vice versa.

Having thus described my invention, I claim as new and desire to secure by Letters Patent—

1. In an ink stand, the combination, with ink wells and covers for the same pivoted to the stand, of a rocking lever fulcrumed on the stand, links connecting the lever with the covers of the ink wells, and movable racks pivoted on the stand and connected with the said rocking lever on different sides of its fulcrum, whereby when a pen-holder is removed from a rack a cover will be opened and another cover closed, substantially as specified.

2. In an ink stand, the combination, with two ink wells and covers for the same pivoted to the stand, of a rocking lever fulcrumed on the stand at its center, links connecting the ends of the lever with the covers of the ink wells, movable racks located in front of the stand, arms carrying the racks, a fixed shaft on which the said arms are pivoted, and links connecting each of the arms with the rocking lever on opposite sides of its fulcrum, whereby when a pen-holder is removed from its rack one cover will be opened and the other closed, substantially as specified.

PHINEAS B. MYERS.

Witnesses:
J. FRED ACKER,
C. SEDGWICK.